United States Patent Office 3,433,818
Patented Mar. 18, 1969

3,433,818
PROCESS FOR PREPARATION OF
DIANILINOSILANES
James E. Webb, Administrator of the National Aeronautics and Space Administration, with respect to an invention of William R. Dunnavant, and Richard A. Markle, both of Columbus, Ohio
No Drawing. Filed Aug. 26, 1966, Ser. No. 575,930
U.S. Cl. 260—448.2   8 Claims
Int. Cl. C07f 7/10, 7/12; C07d 31/20

ABSTRACT OF THE DISCLOSURE

Dianilinosilanes are prepared by reacting a dichlorosilane with aniline in the presence of 2,4,6-trimethylpyridine (s-collidine) in an organic solvent. By-product aniline hydrochloride is removed from the reaction mixture by precipitation as a hydrochloride salt of the s-collidine. Contaminating side-reactions are avoided, and a high-purity product suitable for polymer snythesis is obtained.

---

The invention described herein was made in the performance of work under a NASA contract and is subject to the provisions of Section 305 of the National Aeronautics and Space Act of 1958, Public Law 85–568 (72 Stat. 435; 42 U.S.C. 4257).

This invention relates to the synthesis of dianilinosilanes.

Dianilinosilanes are useful for the preparation of an outstanding new class of silicon-containing polymers. These polyaryloxysilane polymers, exemplified by a structure having the formula

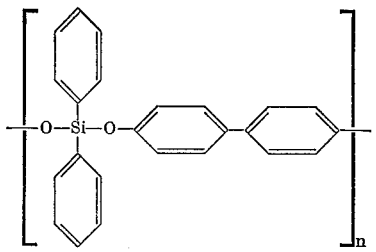

offer properties suitable for use as thermoplastic, thermosetting or elastomeric material for various applications in the aerospace field, for example, as a protective coating, as well as in other fields. In particular the polyaryloxysilane polymers exhibit a high degree of thermal stability and good mechanical properties.

These polymers are prepared by condensation of a dianilinosilane such as dianilinodiphenylsilane with an organic diol such as p,p-biphenol. The most crucial feature of this synthesis is the use of a dianilinosilane reactant having a high degree of purity. The molecular weight and mechanical properties of the polymers are highly sensitive to the presence of impurities in this reactant, and the polymer properties obtained using an impure dianilinosilane are not sufficiently reproducible for practical applications.

Dianilinodiphenylsilane has been prepared previously by reaction of diphenyldichlorosilane with aniline in benzene, the product being recovered by fractional crystallization. The properties of the product in this procedure have been erratic. Melting points as low as 151° C. and as high as 161° C. have been reported, indicating a lack of reproducibility and the presence of impurities. In addition the yield is low, less than 50% being obtained in most cases. It is thus apparent that this procedure would not be suitable for large-scale preparation of the dianilinosilane reactant for polymer synthesis.

It is therefore an object of this invention to provide a process for preparing dianilinosilanes in high-purity form.

Another object is to provide a process for preparing dianilinosilanes wherein a high yield is obtained.

Other objects and advantages of the invention will be apparent from the following description.

In the present invention dianilinosilanes are prepared by reacting a dichlorosilane with aniline in the presence of 2,4,6-trimethylpyridine (s-collidine). A high degree of purity is obtained reproducibly by this means, and product yield is substantially increased. This process is readily amenable to scale up for production of large quantities of dianilinosilane suitable for use in polymer synthesis.

Although this invention is not to be understood as limited to a particular theory, it is postulated that the improved purity and yield largely result from elimination of undesirable side-reactions. The previously known reaction of diphenyldichlorosilane with aniline proceeds as follows:

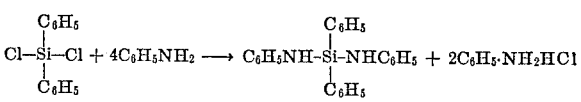

This reaction does not go to completion, however, and the by-product aniline hydrochloride reacts with the product to produce side-reaction products such as anilinodiphenylchlorosilane. The amount of such side-products formed in the reaction mixture is extremely sensitive to minor variations in temperature, reaction time and other conditions. Such side reactions are enhanced by the fact that the aniline hydrochloride salt is soluble in most solvents in the presence of aniline.

The present reaction in the presence of s-collidine is postulated to proceed as follows:

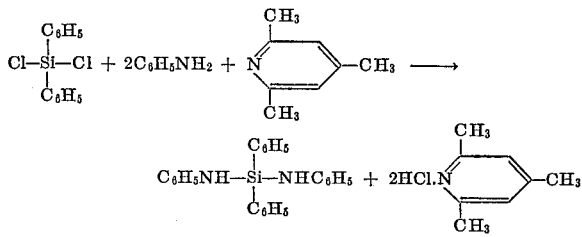

The s-collidine is a stronger base than aniline and acts as a preferential acceptor for the hydrochloric acid produced in the reaction system. In addition, the s-collidine hydrochloride has a very low solubility in the solvents employed, and this compound may be less able, for steric reasons, to react with the silane product to produce undesirable side-reaction products.

The dichlorosilane reactant in the present process is represented by the formula

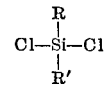

where R and R′ are methyl, phenyl or vinyl radicals. Examples of specific reactants included are diphenyldichlorosilane, dimethyldichlorosilane, methylphenyldichlorosilane and methylvinyldichlorosilane.

The present process is carried out by mixing the dichlorosilane, aniline and s-collidine in a suitable solvent. As indicated by the equation given above, a ratio of two moles aniline per mole silane is used. Excess aniline is to be avoided since side reactions might be enhanced. To ensure that all of the HCl is taken up rapidly, a molar excess of s-collidine is employed, an excess of about 50% being preferred.

The organic solvent for this process can be any solvent in which the reactants and product, but not the s-collidine hydrochloride salt, are soluble and which is inert to the reaction. Examples of suitable solvents include tetrahydrofuran, benzene, and petroleum ether, with tetrahydrofuran being preferred. The amount of solvent is not critical except that enough should be provided to maintain the reactants and the product in solution.

Although the reaction temperature is not critical, a temperature of about 25° to 60° C. is preferred. The reaction proceeds readily at room temperature, heat being liberated when the reactants first come into contact. To avoid over-heating it is preferred to add the dichlorosilane gradually to a mixture of the remaining reactants. A period of about one to three hours is required for completion of the reaction. In order to avoid degradation of the product, the reaction is conducted in the substantial absence of moisture, preferably by providing a dry nitrogen atmosphere over the reaction mixture. As a further precaution the solvents used in the reaction and subsequent recovery steps should be dried prior to use.

The dianilinosilane produced by this reaction is in solution in the reaction medium, the by-product s-collidine hydrochloride forming an insoluble precipitate. This precipitate is readily removed by means such as filtration to allow recovery of the product. The product dianilinosilanes can be recovered from solution by crystallization from solvents such as benzene, petroleum ether or petroleum naphtha. A particularly suitable solvent for this purpose is the high-flash petroleum naphtha having the following properties: distillation temperature range at 760 mm. Hg, 122 to 136° C.; specific gravity, 0.763; Kauri butanol value, 39.9 cc.; aniline point, 122.5° F.; and flash point 59° F. This solvent is available commercially under the tradename "Super Naphtholite." In a preferred procedure the solution containing the dianilinosilane is first subjected to flash evaporation to remove the bulk of the solvent, and the crystallizing solvent is added to the hot concentrate obtained by the flash evaporation at a proportion of about four parts by weight per part dianilinosilane. The resulting solution is then cooled to crystallize the dianilinosilane. In order to remove the small amounts of impurities which are formed in this process the crystallized product is then washed with chloroform, which readily dissolves the impurities. The product is also slightly soluble in chloroform so that a minimum amount of chloroform, a short contact time of less than thirty minutes and a temperature below 30° C. are preferably used to avoid unduly decreasing the yield.

In the preparation of dianilinodiphenylsilane, the product also can be recovered from the solution remaining after removal of the s-collidine hydrochloride by vacuum distillation, the product being removed in the fraction which boils at 250 to 260° C. This method is not recommended for large-scale use because thermal degradation of the product may occur.

The dianilinosilanes produced by this process have a reproducible high purity over 99%, and are suitable for use in preparation of polyaryloxysilane polymers. The products are crystalline solids melting at 166°–167° C. and 63.0°–63.5° C., respectively, for dianilinodiphenylsilane and dianilinodimethylsilane. The presence of significant amounts of impurities is indicated by coloration and by a decrease in melting point. Yields of product obtained in this process are up to 80% to 85%.

The product dianilinosilanes should be stored under dry conditions to avoid degradation prior to use. The use of a dry nitrogen atmosphere in storage is suitable for this purpose.

The invention is further illustrated by the following examples.

EXAMPLE I

Dianilinodiphenylsilane was prepared on a laboratory scale by the following procedure. A mixture of 253.2 grams of diphenyldichlorosilane in 50 milliliters of dry tetrahydrofuran was added over a period of one hour to a stirred mixture of 211 grams of distilled aniline and 596 grams of 2,4,6-trimethylpyridine. After all the silane mixture was added, 400 milliliters of dry tetrahydrofuran was added, and stirring was continued for one hour. The resulting mixture was filtered to give 318 grams of 2,4,6-trimethylpyridine hydrochloride. The filter cake was washed twice with tetrahydrofuran and the combined filtrates were reduced by evaporation until a cream-colored paste was obtained. Petroelum ether was added to the paste and the solid was separated by filtration. The filtrate was cooled in a Dry Ice-acetone bath and then filtered. The combined filter cakes were dissolved in a minimum amount of hot, dry tetrahydrofuran and then cooled and diluted with petroleum ether. The mixture was then cooled in a Dry Ice-acetone bath and filtered. The solid product was dried in a vacuum over for 18 hours. The dried product weighed 292.5 grams (80.3% yield) and had a melting point of 166° to 168° C.

Dianilinodiphenylsilane prepared by this procedure, but in the absence of s-collidine, was obtained at yields of only 40% to 50%, and the product purity was low as evidenced by lower melting points, typically 162° to 163°.

EXAMPLE II

Dianilinodimethylsilane was prepared in a 1-liter, 3-necked flask equipped with a Trubore stirrer, reflux condenser with a drying tube affixed, and a dropping funnel. The apparatus was flame-dried and then swept with nitrogen until cool. A solution of 38.7 g. (0.30 mole) of dimethyldichlorosilane in 100 ml. of petroleum ether (30–60° C.) was placed in the dropping funnel, and 55.9 g. (0.60 mole) of freshly distilled aniline and 109.1 g. (0.90 mole) of s-collidine were mixed with 400 ml. of petroleum ether in the reaction flask. The aniline/s-collidine solution was heated to reflux on a steam bath and the dimethyldichlorosilane solution was added dropwise over a period of one hour while the reaction mixture was stirred rapidly. The resulting thick white slurry was held at the reflux temperature while being stirred for one additional hour, and was then cooled slowly to about 30° C. The warm slurry was filtered with suction on a sintered glass funnel and the filter cake was washed with warm petroleum ether. The dried filter cake, consisting of s-collidine hydrochloride, weighed 93.0 g. (98 percent of theoretical). The combined petroleum ether filtrates were evaporated to a yellow viscous liquid by using a rotary evaporator at reduced pressure. The viscous yellow residue was dissolved in 100 ml. of warm 30–60° C. petroleum ether and allowed to stand at 23° C. for 18 hours.

A 50.0 g. crop (about 70 percent yield) of yellow crystals, melting point 57–59° C., was obtained. Three crystallizations from petroleum ether provided 43.0 grams (60 percent yield) of pure white, crystalline dianilinodimethylsilane, melting point 63.0–63.5° C .

*Analysis.*—Calculated for $C_{14}H_{18}SiN_2$: C, 69.36; H, 7.49; N, 11.56. Found: C, 69.23; H, 7.60; N, 11.44.

EXAMPLE III

A series of pilot-scale syntheses of dianilinodiphenylsilane was carried out in a ten-gallon stainless steel reactor equipped with a double-anchor stirring blade. The reactor was provided with a jacket for heating and cooling and means for maintaining a dry nitrogen atmosphere. Six runs were made using the following amounts of reactants: diphenyldichlorosilane, 4,702 grams; aniline, 3,636 grams; s-collidine, 11,100 grams; and tetrahydrofuran solvent, 2.5 gallons. In each run the aniline, s-collidine and solvent were placed in the reactor and stirred under a nitrogen atmosphere. The diphenyldichlorosilane was then added in 1,000 milliliter portions at 15 minute intervals. The reaction mixture was stirred and held at a temperature of 60° C. for 4 to 5 hours. The mixture was then cooled to room temperature and filtered. The filter cakes were washed with tetrahydrofuran at room temperature. The combined filtrates were evaporated in a Luwa P46 evaporator to one-third the original volume, and the resulting concentrates were diluted while hot with equal volumes of the high-flash petroleum naphtha available commercially as "Super Naphtholite." The latter treatment caused the dianilinosilane to crystallize as small, loose, cream-colored crystals. After standing overnight, the mixtures were filtered and the crystalline product was washed once with the high-flash petroleum naphtha and once with chloroform. The resulting slurries were filtered to give white crystalline material. The product was then dried at 60° C. under a stream of nitrogen. A colorless, crystalline material having a melting point of 166°–167° C. was obtained at a yield of 60% to 65% in each case. These runs demonstrate that dianilinosilanes can be prepared reproducibly on a large scale by the process of this invention.

The above examples are merely illustrative and are not to be understood as limiting the scope of the invention, which is limited only as indicated by the appended claims. Furthermore, it is to be understood that numerous modifications and changes may be employed by one skilled in the art without departing from the scope of the invention.

What is claimed is:

1. The process of preparing a dianilinosilane which comprises reacting a dichlorosilane having the formula

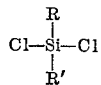

where R is a methyl, a vinyl, or a phenyl radical and R' is a methyl, a vinyl, or a phenyl radical with aniline in the presence of 2,4,6-trimethylpyridine in an inert organic solvent, separating the resulting precipitated 2,4,6-trimethylpyridine hydrochloride from the remaining solution and recovering the resulting dianilinosilane from said remaining solution.

2. The process of claim 1 wherein the molar ratio of aniline to dichlorosilane is about 2:1.

3. The process of claim 2 wherein the molar ratio of 2,4,6-trimethylpyridine to dichlorosilane is in excess of 1:1.

4. The process of claim 3 wherein the resulting dianilinosilane is recovered by crystallization from benzene, petroleum ether or high-flash petroleum naphtha.

5. The process of claim 4 wherein the resulting dianilinosilane is washed in chloroform.

6. The process of claim 1 wherein said inert organic solvent is tetrahydrofuran.

7. The process of claim 1 wherein said dichlorosilane is diphenyldichlorosilane.

8. The process of claim 1 wherein said dichlorosilane is dimethyldichlorosilane.

References Cited

UNITED STATES PATENTS

| | | | |
|---|---|---|---|
| 2,579,418 | 12/1951 | Cheronis | 260—448.2 XR |
| 3,007,886 | 11/1961 | Parker | 260—448.2 XR |
| 3,036,019 | 5/1962 | Molotsky et al. | 260—448.2 XR |
| 3,072,594 | 1/1953 | Shultz et al. | 260—448.2 XR |
| 3,143,514 | 8/1964 | Boyer | 260—448.2 XR |

TOBIAS E. LEVOW, *Primary Examiner.*

J. P. PODGORSKI, *Assistant Examiner.*

U.S. Cl. X.R.

260—2, 46.5, 448.8